US012643463B2

(12) United States Patent  
Tachikawa

(10) Patent No.: US 12,643,463 B2  
(45) Date of Patent: Jun. 2, 2026

(54) LIGHT ILLUMINATION CONTROL DEVICE, LIGHT ILLUMINATION CONTROL METHOD, AND PROGRAM

(71) Applicants: TOYOTA JIDOSHA KABUSHIKI KAISHA, Toyota (JP); DENSO CORPORATION, Kariya (JP)

(72) Inventor: Hisayoshi Tachikawa, Toyota (JP)

(73) Assignees: TOYOTA JIDOSHA KABUSHIKI KAISHA, Toyota (JP); DENSO CORPORATION, Kariya-City (JP)

( * ) Notice: Subject to any disclaimer, the term of this patent is extended or adjusted under 35 U.S.C. 154(b) by 341 days.

(21) Appl. No.: 18/371,224

(22) Filed: Sep. 21, 2023

(65) Prior Publication Data

US 2024/0140300 A1 May 2, 2024

(30) Foreign Application Priority Data

Nov. 1, 2022 (JP) ................................. 2022-175867

(51) Int. Cl.  
*B60Q 1/08* (2006.01)  
*B60Q 1/00* (2006.01)

(52) U.S. Cl.  
CPC ........... *B60Q 1/085* (2013.01); *B60Q 1/0023* (2013.01); *B60Q 2300/056* (2013.01); *B60Q 2300/112* (2013.01); *B60Q 2300/314* (2013.01); *B60Q 2300/42* (2013.01)

(58) Field of Classification Search  
CPC .... B60Q 1/143; B60Q 2300/42; B60Q 1/085; B60Q 2300/45; B60Q 2300/41; B60Q 2300/056; B60Q 2300/054; B60Q 2300/112; B60Q 2300/122; B60Q 1/0023; B60Q 2300/314  
See application file for complete search history.

(56) References Cited

U.S. PATENT DOCUMENTS

2012/0226412 A1* 9/2012 Nakadate ............... B60Q 1/143  
                                  701/36  
2012/0271511 A1* 10/2012 Dierks ................... B60Q 1/143  
                                  701/36  
2013/0218413 A1* 8/2013 Tanaka ................... B60Q 1/143  
                                  701/36

(Continued)

FOREIGN PATENT DOCUMENTS

JP 2017-013516 A 1/2017

*Primary Examiner* — Wei (Victor) Y Chan  
(74) *Attorney, Agent, or Firm* — Sughrue Mion, PLLC

(57) ABSTRACT

A light illumination control device that controls light emission of front lamps based on results of sensing an object present at a front side of an own vehicle, including a processor coupled to a memory, wherein: when the object is a target of light adjustment, the processor computes a light adjustment area that is an area including the object that is a target of light adjustment and when an amount of light that is illuminated is made to be different than that of illuminated regions other than the light adjustment area, and when the object that is a target of light adjustment is an approaching object that advances in a direction of approaching the own vehicle, and a distance between the own vehicle and the approaching object is less than or equal to a predetermined value, the processor enlarges a range of the computed light adjustment area.

4 Claims, 6 Drawing Sheets

(56) References Cited

U.S. PATENT DOCUMENTS

| | | | |
|---|---|---|---|
| 2015/0051797 A1* | 2/2015 | Ehlgen | B60Q 1/085 |
| | | | 701/49 |
| 2015/0149045 A1* | 5/2015 | Mizuno | B60Q 1/08 |
| | | | 701/49 |
| 2015/0151669 A1* | 6/2015 | Meisner | G06V 20/584 |
| | | | 701/49 |
| 2016/0250964 A1* | 9/2016 | Takagaki | B60Q 1/08 |
| | | | 362/466 |
| 2017/0043702 A1* | 2/2017 | Park | B60Q 1/076 |
| 2017/0182931 A1* | 6/2017 | Son | F21S 41/663 |
| 2018/0170241 A1 | 6/2018 | Mizuno et al. | |

* cited by examiner

LIGHT ILLUMINATION CONTROL DEVICE, LIGHT ILLUMINATION CONTROL METHOD, AND PROGRAM

CROSS-REFERENCE TO RELATED APPLICATION

This application is based on and claims priority under 35 USC 119 from Japanese Patent Application No. 2022-175867 filed on Nov. 1, 2022, the disclosure of which is incorporated by reference herein.

BACKGROUND

Technical Field

The present disclosure relates to a light illumination control device, a light illumination control method, and a program.

Related Art

There are known control devices that control the emission of light from front lamps on the basis of results of sensing an object existing at the front side of an own vehicle (see, for example, Japanese Patent Application Laid-Open (JP-A) No. 2017-13516). Such a control device carries out control of the light emission such that there becomes a state in which, at the position of a predetermined target object, the amount of light that is illuminated is different than the standard illuminated amount.

However, in a case in which the object is an approaching object, such as an oncoming vehicle or the like for example, that is advancing in a direction of approaching the own vehicle, and the relative moving speed of the own vehicle and the approaching object is fast, carrying out predetermined light emission control after the approaching object has been sensed may not obtain the desired effects of the light emission.

SUMMARY

In view of the above-described circumstances, an object of the present disclosure to provide a light illumination control device, a light illumination control method and a program by which desired effects of light emission can be obtained even in a case in which the relative moving speed of the own vehicle and an approaching object is fast.

A light illumination control device of a first aspect of the present disclosure is a light illumination control device that acquires results of sensing of an object present at a front side of an own vehicle, and that, based on the results of sensing, controls light emission of front lamps that illuminate light toward the front side of the own vehicle, the light illumination control device including: a memory; and a processor coupled to the memory, wherein: in a case in which the object is an object that is a target of light adjustment, the processor computes a light adjustment area that is an area including the object that is a target of light adjustment and in which an amount of light that is illuminated is made to be different than that of illuminated regions other than the light adjustment area, and, in a case in which the object that is a target of light adjustment is an approaching object that advances in a direction of approaching the own vehicle, and a distance between the own vehicle and the approaching object is less than or equal to a predetermined value, the processor enlarges a range of the computed light adjustment area.

Note that the "object that is a target of light adjustment" in the first aspect means, among objects, a targeted object whose amount of light received from the front lamps is to be adjusted. The concept of the "amount of light that is received is adjusted" includes the received light amount being adjusted to zero. (The same holds throughout the present specification.)

In accordance with the above-described structure, the light illumination control device acquires results of sensing of an object present at the front side of the own vehicle, and, based on the results of sensing, controls the light emission of the front lamps that illuminate light toward the front side of the own vehicle. In a case in which the object is an object that is a target of light adjustment, the processor computes a light adjustment area that is an area including the object that is a target of light adjustment and in which the amount of light that is illuminated is made to be different than that of illuminated regions other than this area. Further, in a case in which the object that is a target of light adjustment is an approaching object that advances in a direction of approaching the own vehicle, and the distance between the own vehicle and the approaching object is less than or equal to a predetermined value, the processor enlarges the range of the computed light adjustment area. Due thereto, even if the relative moving speed of the own vehicle and the targeted object is fast, the light adjustment area can be made to overlap a range that includes the approaching object, and the desired effects of the light emission can be obtained.

In a light illumination control device of a second aspect of the present disclosure, in the structure of the light illumination control device of the first aspect, in a case in which the distance between the own vehicle and the approaching object is less than or equal to the predetermined value, the processor enlarges the range of the light adjustment area in a left-right direction and toward a lower side in a vertical direction, based on at least one of the distance between the own vehicle and the approaching object or a relative speed of the own vehicle and the approaching object.

In accordance with the above-described structure, even in a case in which the relative moving speed of the own vehicle and the targeted object is fast, overlapping of the light adjustment area on a range that includes the approaching object can be realized easily.

In a light illumination control device of a third aspect of the present disclosure, in the structure of the light illumination control device of the first aspect or the second aspect, the processor controls the front lamps so as to make an amount of light illuminated toward the light adjustment area less than an amount of light illuminated toward regions other than the light adjustment area.

Note that the concept of "making the amount of light that is illuminated . . . be less than" includes decreasing the amount of light that is illuminated to zero.

In accordance with the above-described structure, even in a case in which the relative moving speed of the own vehicle and the targeted object is fast, it is possible to not impart glare to the approaching object, while ensuring the visibility of regions other than the vicinity of the approaching object.

A light illumination control method of a fourth aspect of the present disclosure is a light illumination control method that controls light emission of front lamps, which illuminate light toward a front side of an own vehicle, based on results of sensing an object present at the front side of the own vehicle, and in which a computer executes processing including: in a case in which the object is an object that is a target of light adjustment, computing a light adjustment area that is an area including the object that is a target of light adjustment and in which an amount of light that is illuminated is made to be different than that of illuminated regions other than the light adjustment area; and, in a case in which the object that is a target of light adjustment is an approaching object that advances in a direction of approaching the own vehicle, and a distance between the own vehicle and the approaching object is less than or equal to a predetermined value, enlarging a range of the computed light adjustment area. Therefore, in the same way as in the light illumination control device of the first aspect, even if the relative moving speed of the own vehicle and the targeted object is fast, the light adjustment area can be made to overlap a range that includes the approaching object, and the desired effects of the light emission can be obtained.

A program recorded on a non-transitory recording medium of a fifth aspect of the present disclosure is a program that controls light emission of front lamps, which illuminate light toward a front side of an own vehicle, based on results of sensing an object present at the front side of the own vehicle, and that is executable by a computer to perform processing including: in a case in which the object is an object that is a target of light adjustment, computing a light adjustment area that is an area including the object that is a target of light adjustment and in which an amount of light that is illuminated is made to be different than that of illuminated regions other than the light adjustment area; and, in a case in which the object that is a target of light adjustment is an approaching object that advances in a direction of approaching the own vehicle, and a distance between the own vehicle and the approaching object is less than or equal to a predetermined value, enlarging a range of the computed light adjustment area. Therefore, due to a computer executing the program relating to the fifth aspect, in the same way as in the light illumination control device of the first aspect, even if the relative moving speed of the own vehicle and the targeted object is fast, the light adjustment area can be made to overlap a range that includes the approaching object, and the desired effects of the light emission can be obtained.

As described above, in accordance with the present disclosure, even if the relative moving speed of the own vehicle and an approaching object is fast, the desired effects of light emission can be obtained.

BRIEF DESCRIPTION OF THE DRAWINGS

An exemplary embodiment of the present invention will be described in detail based on the following figures, wherein.

DETAILED DESCRIPTION

An embodiment of the present disclosure is described with reference to the drawings.

Figure 1:
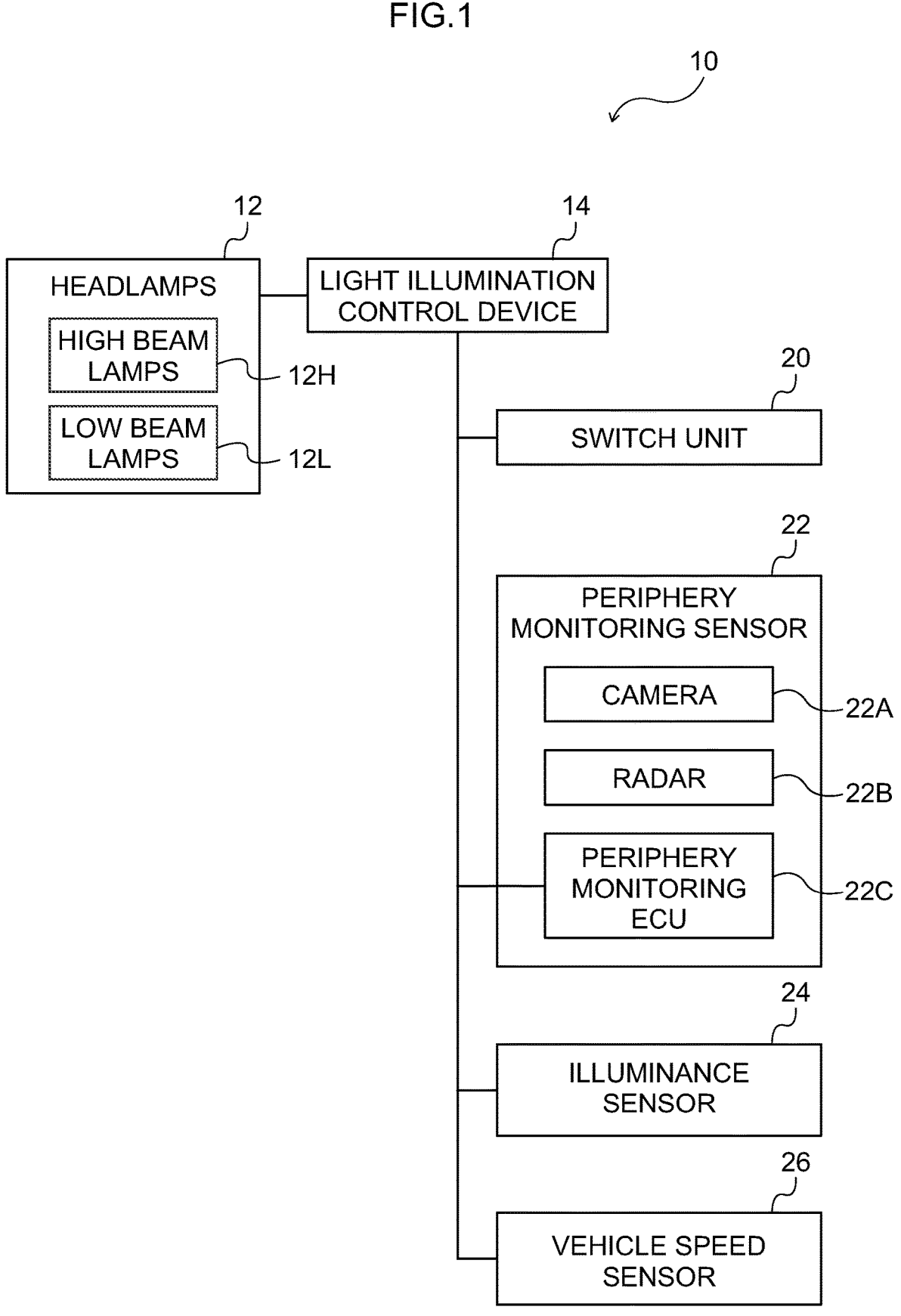
FIG. 1 is a schematic structural drawing of a vehicle front lamp system that includes a light illumination control device relating to an embodiment of the present disclosure.

A schematic structural view of a vehicle front lamp system 10, which includes a light illumination control device 14 relating to the present embodiment, is illustrated in FIG. 1. The vehicle front lamp system 10 is structured to include the functional structure of an adaptive high beam system (hereinafter abbreviated as "AHS"). AHS is a system that can control the light emission of the high beam lamps so as to not impart glare to other vehicles ahead. The vehicle front lamp system 10 has headlamps 12 serving as the front lamps, the light illumination control device 14, a switch unit 20, a periphery monitoring sensor 22 serving as an object sensing sensor, an illuminance sensor 24 and a vehicle speed sensor 26. Note that, hereinafter, the vehicle in which the vehicle front lamp system 10 is installed is called the own vehicle.

The headlamps 12 are disposed at the front end portion side of the own vehicle and are structured so as to illuminate light toward the front side of the own vehicle. The headlamps 12 have high beam lamps 12H and low beam lamps 12L. Note that, in FIG. 1, only one of each of the high beam lamps 12H and the low beam lamps 12L is illustrated in block form, but the high beam lamps 12H and the low beam lamps 12L are respectively disposed at the left and right of the front end portion side of the vehicle. The left and right high beam lamps 12H each have plural light sources, and are structured so as to be able to correspond to an AHS. In further detail, from the standpoints of improving nighttime visibility and not imparting glare to others, the left and right high beam lamps 12H are high-precision lamps that can realize contracting of a light-blocked range that is for preventing glare (in other words, can realize blocking of light that accords with the outer shape of another vehicle).

The light illumination control device 14 is an ECU (Electronic Control Unit) that controls the headlamps 12, and is also called a lamp ECU. The light illumination control device 14 is connected to the headlamps 12, the switch unit 20, the periphery monitoring sensor 22, the illuminance sensor 24 and the vehicle speed sensor 26. The light illumination control device 14 is structured so as to realize light emission control of an AHS based on information from the switch unit 20, the periphery monitoring sensor 22, the illuminance sensor 24 and the vehicle speed sensor 26. Note that the AHS also includes a function of automatically switching between lighting of the low beam lamps 12L and lighting of the high beam lamps 12H. Details of the light illumination control device 14 are described later.

The switch unit 20 includes, for example, a lamp switch for carrying out switching relating to the turning on and turning off of the headlamps 12, and an AHS switch for switching the AHS on and off. The respective switches of the switch unit 20 can be operated by the driver.

The periphery monitoring sensor 22 has a camera (hereinafter also called "imaging device") 22A, a radar 22B and a periphery monitoring ECU 22C connected to the camera 22A and the radar 22B. The camera 22A has a lens and an imaging element, is disposed at a position at which it can capture images of the front side of the own vehicle, and captures images of the front side of the own vehicle. The radar 22B transmits radio waves (millimeter waves) for example toward the front side of the vehicle, and receives radio waves reflected by arbitrary objects. On the basis of the information outputted from the camera 22A and the radar 22B, the periphery monitoring ECU 22C senses objects present at the front side of the own vehicle and the positions of the objects. The periphery monitoring ECU 22C is connected to the light illumination control device 14, and transmits information relating to the sensed objects to the light illumination control device 14.

The illuminance sensor 24 senses the illuminance at the front side of the own vehicle, and transmits information of the sensed illuminance to the light illumination control device 14. The vehicle speed sensor 26 senses the speed of the own vehicle, and transmits information of the sensed vehicle speed to the light illumination control device 14.

Figure 2:
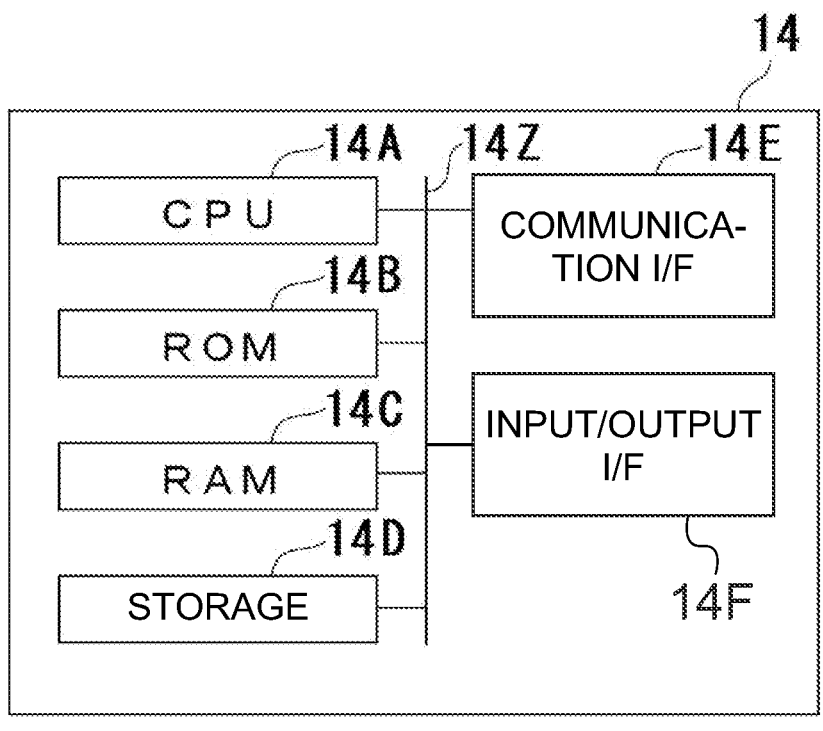
FIG. 2 is a block drawing illustrating an example of hardware structures of the light illumination control device.

An example of hardware structures of the light illumination control device 14 is illustrated in a block drawing in FIG. 2. The light illumination control device 14 is structured to include a CPU (Central Processing Unit: processor) 14A, a ROM (Read Only Memory) 14B, a RAM (Random Access Memory) 14C, a storage 14D, a communication interface (abbreviated as "communication I/F" in FIG. 2) 14E, and an input/output interface (abbreviated as "input/output I/F" in FIG. 2) 14F. The CPU 14A, the ROM 14B, the RAM 14C, the storage 14D, the communication interface 14E and the input/output interface 14F are connected so as to be able to communicate with one another via bus 14Z.

The CPU 14A is a central computing processing unit, and executes various programs and controls respective sections. Namely, the CPU 14A reads-out a program from the ROM 14B or the storage 14D, and executes the program by using the RAM 14C as a workspace. The CPU 14A carries out control of the above-described respective structures, and various computing processing, in accordance with programs recorded in the ROM 14B or the storage 14D.

The ROM 14B stores various programs and various data. The RAM 14C temporarily stores programs and data as a workspace. The storage 14D is structured by a storage device such as an HDD (Hard Disk Drive) or an SSD (Solid State Drive) or the like, and stores various programs and various data. Note that, in the present embodiment, a program for controlling the headlamps 12, and the like, are stored in the ROM 14B or the storage 14D.

The communication interface 14E is an interface for communication with other equipment such as a portable terminal (not illustrated) and the like. Wireless communication standards such as, for example, 4G, 5G, Wi-Fi™ or the like are used in this communication.

The input/output interface 14F is an interface for communication with the respective devices that are installed in the own vehicle. The headlamps 12, the switch unit 20, the periphery monitoring ECU 22C, the illuminance sensor 24 and the vehicle speed sensor 26 that are illustrated in FIG. 1 are connected to the light illumination control device 14 of the present embodiment via the input/output interface 14F.

Note that the above-described periphery monitoring ECU 22C also is structured to include, as an example, a CPU, a ROM, a RAM, a storage, a communication interface and an input/output interface. At the periphery monitoring ECU 22C as well, the CPU reads-out programs from the ROM or the storage, and carries out various types of control by executing the programs by using the RAM as a workspace.

Figure 3:
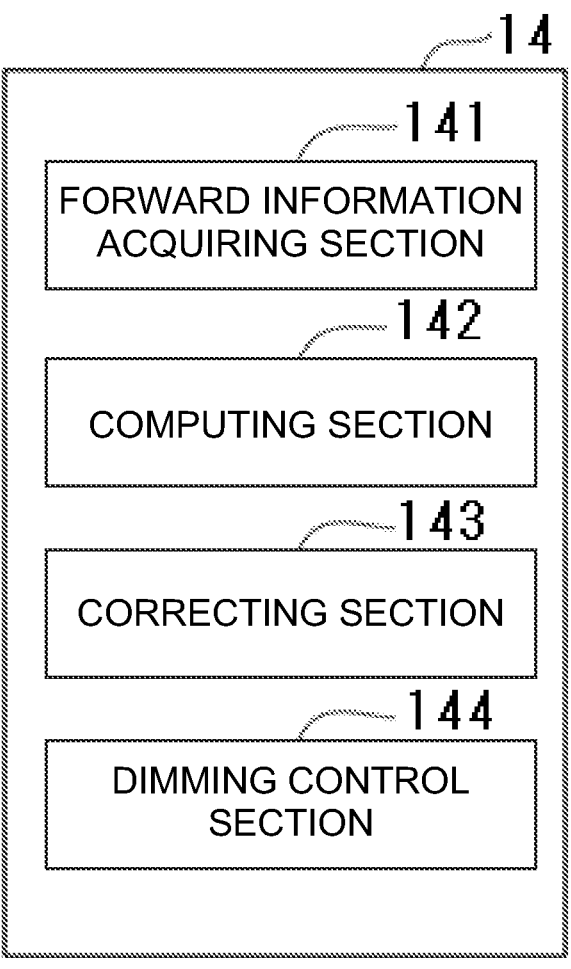
FIG. 3 is a block drawing illustrating an example of functional structures of the light illumination control device.

The light illumination control device 14 is a computer that acquires the results of sensing by the periphery monitoring sensor 22, and, based on these results of sensing, controls the light emission of the headlamps 12. An example of functional structures of the light illumination control device 14 is illustrated in a block drawing in FIG. 3. As illustrated in FIG. 3, the light illumination control device 14 has, as the functional structures thereof, a forward information acquiring section 141, a computing section 142, a correcting section 143 and a dimming control section 144. These respective functional structures are realized at the light illumination control device 14 due to the CPU 14A illustrated in FIG. 2 reading-out a headlamp control program that is stored in the ROM 14B or the storage 14D and executing the headlamp control program.

The forward information acquiring section 141 illustrated in FIG. 3 acquires the results of sensing by the periphery monitoring sensor 22. In a case in which the object is an object that is a target of light adjustment, the computing section 142 computes a light adjustment area that is an area including the object that is a target of light adjustment, and in which the amount of light that is illuminated is made to be different than that of illuminated regions other than this area.

Further, in a case in which an object that is a target of light adjustment is an approaching object that is advancing in a direction of approaching the own vehicle, and the distance between the own vehicle and the approaching object is less than or equal to a predetermined value, the correcting section 143 enlarges the range of the light adjustment area computed by the computing section 142. More specifically, in a case in which the distance between the own vehicle and the approaching object is less than or equal to a predetermined value, the correcting section 143 enlarges the range of the light adjustment area in the left-right direction and toward the lower side in the vertical direction, based on at least one of the distance between the own vehicle and the approaching object or the relative speed of the own vehicle and the approaching object.

The dimming control section 144 controls the high beam lamps 12H of the headlamps 12 so as to make the amount of light illuminated toward the light adjustment area be less than the amount of light illuminated toward regions other than the light adjustment area. In this embodiment, as an example, the amount of light illuminated toward the light adjustment area is made to be zero, and this type of dimming is also called light blocking.

Figure 4:
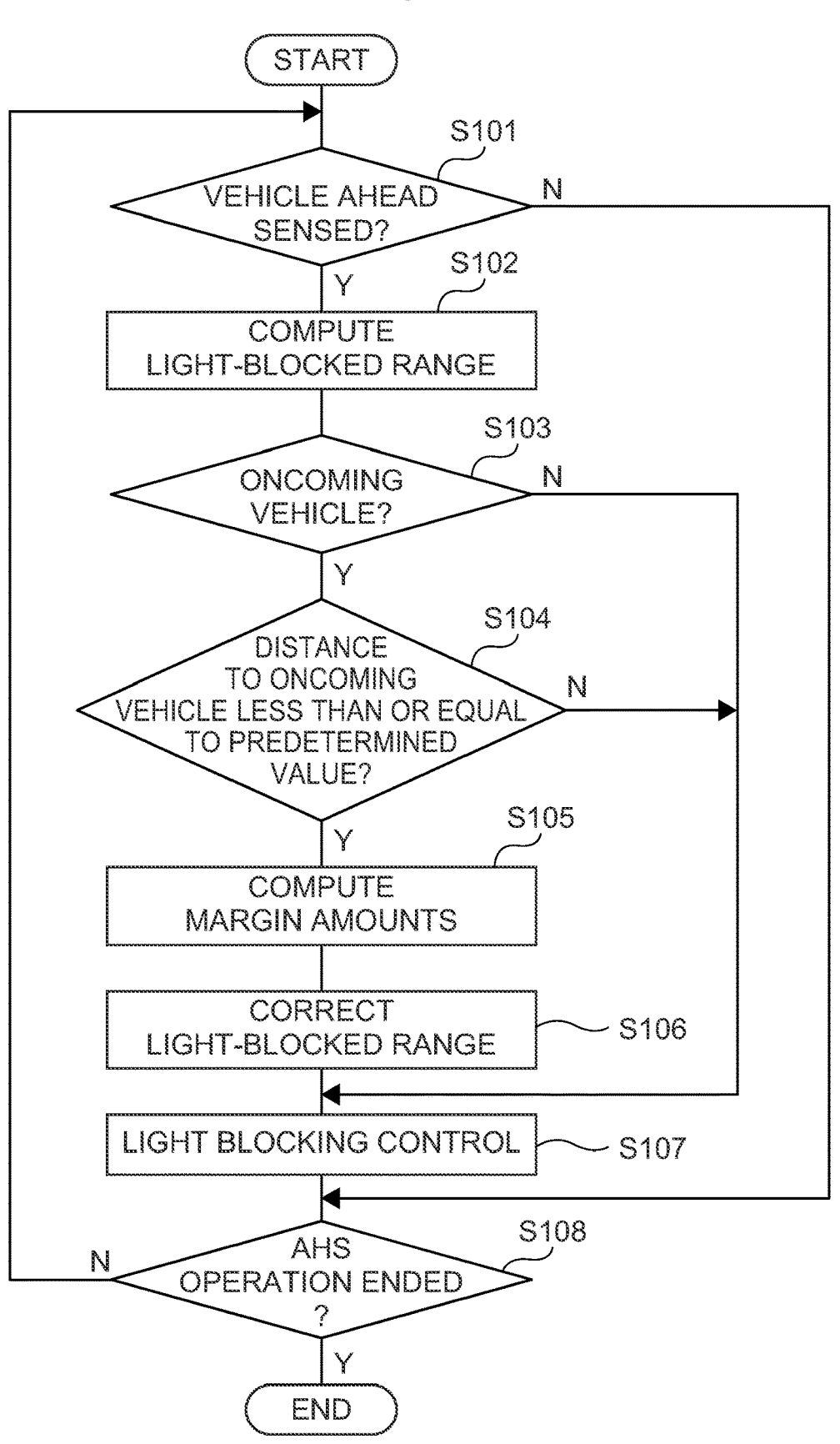
FIG. 4 is a flowchart illustrating an example of the flow of control processing of the light illumination control device.

A method of controlling light illumination, which controls the light emission of the headlamps 12 based on the results of sensing of an object that exists at the front side of the own vehicle, is described next as an example of the operation of the light illumination control device 14. An example of the flow of control processing by the light illumination control device 14 is illustrated in a flowchart in FIG. 4. The control processing by the light illumination control device 14 is carried out due to the CPU 14A reading-out the headlamp control program from the ROM 14B or the storage 14D, and expanding and executing the program in the RAM 14C. As an example, execution of the control processing illustrated in FIG. 4 is started when, in a state in which an unillustrated ignition switch is on, the AHS switch of the switch unit 20 is turned on and the AHS operates.

The CPU 14A acquires, from the periphery monitoring sensor 22, results of sensing objects that exist at the front side of the own vehicle, and, based on these results of sensing, judges whether or not another vehicle that is an object that is a target of light adjustment has been sensed at the front side of the own vehicle (step S101). If another vehicle is not sensed at the front side of the own vehicle (step S101: N), the CPU 14A moves on to the processing of step S108. If another vehicle is sensed at the front side of the own vehicle (step S101: Y), the CPU 14A computes a light-blocked range as a light adjustment area that is for making it such that glare is not imparted to the driver of the another vehicle (step S102). Namely, in step S102, the CPU 14A computes the light-blocked range as the light adjustment area that is an area including the another vehicle and at which the amount of light that is illuminated is made to be different than that at illuminated regions other than that area (here, at which the amount of light that is illuminated is made to be zero).

After the processing of step S102, the CPU 14A judges whether or not the another vehicle that was sensed is an oncoming vehicle that is an approaching object advancing in a direction of approaching the own vehicle (step S103). If the sensed another vehicle is not an oncoming vehicle (step S103: N), the CPU 14A moves on to the processing of step S107. If the sensed another vehicle is an oncoming vehicle (step S103: Y), the CPU 14A judges whether or not the distance between the own vehicle and the oncoming vehicle is less than or equal to predetermined value L (step S104).

If the distance between the own vehicle and the oncoming vehicle exceeds the predetermined value L (step S104: N), the CPU 14A moves on to the processing of step S107. If the distance between the own vehicle and the oncoming vehicle is less than or equal to the predetermined value L (step S104: Y), the CPU 14A computes the amount by which the light-blocked range is to be enlarged (the margin amounts) (step S105). In this step S105, as an example, the CPU 14A computes first margin amount a that depends on the distance between the own vehicle and the oncoming vehicle, and second margin amount b that depends on the relative speed of the own vehicle and the oncoming vehicle. In other words, in step S105, the CPU 14A computes the first margin amount a that corresponds to the distance between the own vehicle and the oncoming vehicle, and computes the second margin amount b that corresponds to the relative speed of the own vehicle and the oncoming vehicle.

The first margin amount a and the second margin amount b are respectively determined for each of the width direction (the left-right direction) and the height direction (the vertical direction). Note that the first margin amount a can be expressed as $(a_w, a_h)$, and the second margin amount b can be expressed as $(b_w, b_h)$. $a_w$ and $b_w$ are values in the width direction, and $a_h$ and $b_h$ are values in the height direction.

After the processing of step S105, the CPU 14A corrects the light-blocked range so as to enlarge the light-blocked range (step S106). Specifically, in step S106, as an example, the CPU 14A adds the first margin amount a and the second margin amount b that were computed in step S105 to the light-blocked range computed in step S102, and corrects the light-blocked range.

In step S107, the CPU 14A controls the headlamps 12 such that the amount of light illuminated in the light-blocked range is zero. Due thereto, the ability to prevent glare from being imparted to the driver of the oncoming vehicle can be ensured.

In step S108, the CPU 14A judges whether or not the AHS operation has been ended, based on, for example, whether the AHS switch of the switch unit 20 has been turned off, or the like. If it is judged that operation of the AHS has not been ended (step S108: N), the CPU 14A repeats the processing from step S101. If it is judged that the operation of the AHS has been ended (step S108: Y), the CPU 14A ends the control processing illustrated in FIG. 4.

Examples of the light-blocked range in a case in which the above-described control processing is executed are described next with reference to FIG. 5 and FIG. 6.

Figure 5:
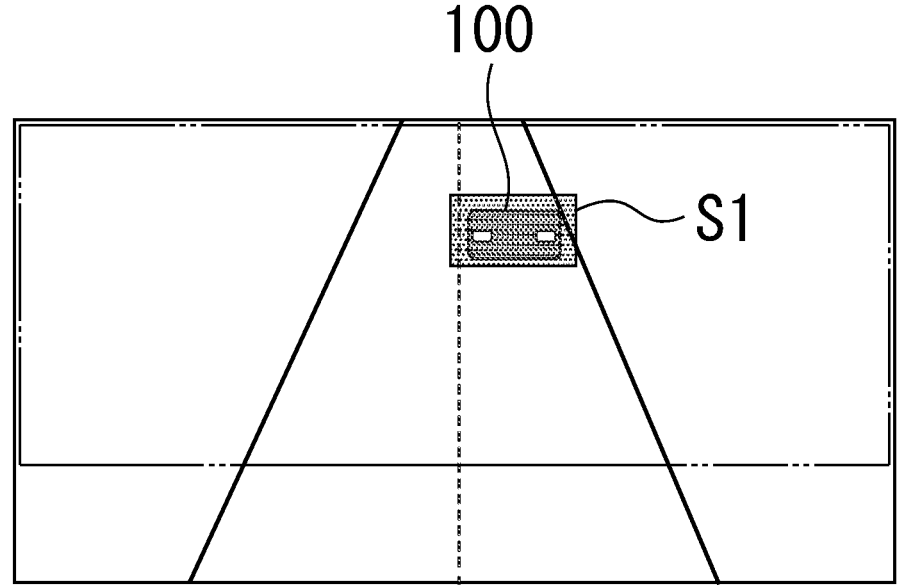
FIG. 5 is an image drawing schematically illustrating an example of a light-blocked range in a case in which a distance between an own vehicle and an oncoming vehicle exceeds a predetermined value.

FIG. 5 is an image drawing of the front side of the own vehicle, and schematically illustrates an example of a light-blocked range S1 in a case in which the distance between the own vehicle and oncoming vehicle 100 (illustrated in a simplified manner in the drawings) exceeds the predetermined value L. The range, which is within the range surrounded by the two-dot chain line and is other than the light-blocked range S1 in FIG. 5, is the illuminated region.

As illustrated in FIG. 5, in a case in which the distance between the own vehicle and the oncoming vehicle 100 exceeds the predetermined value L, the light-blocked range S1 is set so as to accord with the outer shape of the oncoming vehicle 100 (is set so as to be slightly larger than the oncoming vehicle 100). Due thereto, the light-blocked range S1 can be kept small, and contraction of the illuminated region can be suppressed.

Figure 6:
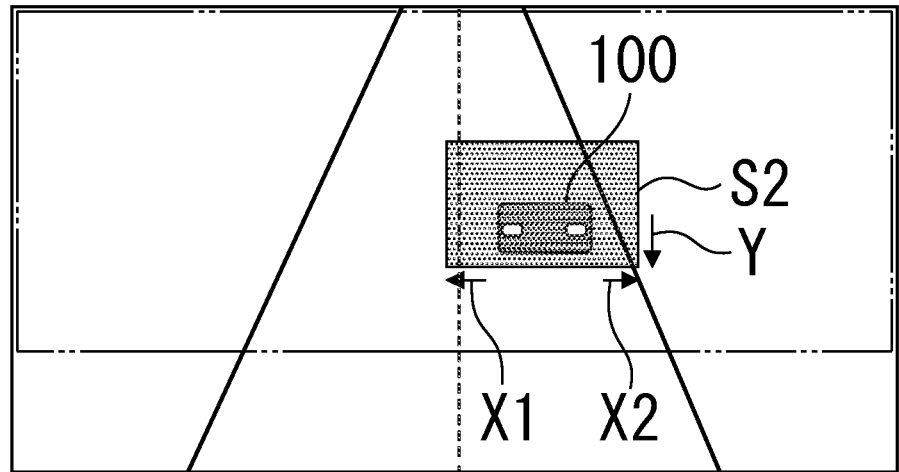
FIG. 6 is an image drawing schematically illustrating an example of a light-blocked range in a case in which the distance between the own vehicle and the oncoming vehicle is less than or equal to the predetermined value.

FIG. 6 is another image drawing of the front side of the own vehicle, and schematically illustrates an example of light-blocked range S2 in a case in which the distance between the own vehicle and the oncoming vehicle 100 is less than or equal to the predetermined value L. The range, which is within the range surrounded by the two-dot chain line and is other than the light-blocked range S2 in FIG. 6, is the illuminated region.

As illustrated in FIG. 6, in a case in which the distance between the own vehicle and the oncoming vehicle 100 is less than or equal to the predetermined value L, the light-blocked range S2 is enlarged in the left-right direction (refer to arrow X1 and arrow X2) and toward the lower side in the vertical direction (refer to arrow Y), by amounts corresponding to the addition of the first margin amount a and the second margin amount b. Therefore, even if the relative speed of the own vehicle and the oncoming vehicle 100 is fast, the light-blocked range S2 can be made to overlap a range that includes the oncoming vehicle 100.

In further detail, in a case in which the light-blocked range S1 is contracted as illustrated in FIG. 5, if the relative speed of the own vehicle and the oncoming vehicle 100 is fast, there is the possibility that the light-blocked range S1 will deviate from the oncoming vehicle 100 at the time when the own vehicle and the oncoming vehicle 100 pass by one another, or the like. However, here, when the distance between the own vehicle and the oncoming vehicle 100 becomes less than or equal to the predetermined value L, as illustrated in FIG. 6, the light-blocked range S2 is enlarged in advance by amounts corresponding to the addition of the first margin amount a and the second margin amount b, and therefore, the light-blocked range S2 deviating from the oncoming vehicle 100 can be prevented.

As described above, in accordance with the present embodiment, the desired effects due to light emission can be obtained even if the relative moving speed of the own vehicle and an approaching object is fast.

Note that, in step S106 of the flowchart illustrated in FIG. 4, as an example, the CPU 14A corrects the light-blocked range by adding the first margin amount a and the second margin amount b, which were computed in step S105, to the light-blocked range that was computed in step S102. However, in step S106, the CPU 14A may correct the light-blocked range by adding one value that is the larger value among the first margin amount a and the second margin amount b, which were computed in step S105, to the light-blocked range computed in step S102.

Further, in the above-described embodiment, the amount of light that is illuminated is made to be zero in the light-blocked range that is the light adjustment area. However, as a modified example of the above-described embodiment, in the light adjustment area, dimming control may be carried out in which the amount of light that is illuminated is reduced but is not lowered to zero.

Further, in the above-described embodiment, in order to prevent imparting glare to others, control is carried out such that, in the light adjustment area that is enlarged in a case in which the distance between the own vehicle and the approaching object is less than or equal to the predetermined value L, the amount of light that is illuminated is made to be zero in the entire range of the light adjustment area. However, as a modified example, it may be made such that glare is not imparted to others by effecting control such that the amount of light illuminated at the outer peripheral end side portions of the enlarged light adjustment area is made to be a low value other than zero, and the amount of light illuminated at the portion other than this within the light adjustment area is zero.

As a modified example of the above-described embodiment, there may be provided a light increasing control section that controls the front lamps such that the amount of light illuminated onto the light adjustment area, which includes an approaching object that satisfies a given, specific condition (e.g., an unmanned moving body such as a drone or the like that advances in a direction of approaching the own vehicle), is made to be greater than the amount of light illuminated toward regions other than the aforementioned light adjustment area.

Moreover, as a modified example of the above-described embodiment, the light illumination control device may execute control processing, which is similar to that in a case in which there exists an oncoming vehicle, also in a case in which the approaching object that advances in a direction of approaching the own vehicle is a pedestrian. Note that, in the above-described embodiment, targets included as the oncoming vehicle may be only automobiles, or may be automobiles and motorcycles, or may be automobiles, motorcycles and bicycles.

Further, as a modified example of the above-described embodiment, in a case in which the distance between the own vehicle and the approaching object is less than or equal to the predetermined value, the correcting section (143) may enlarge the range of the light adjustment area, for example, in accordance with the speed of the own vehicle, or in accordance with the time elapsed from the time when the distance between the own vehicle and the approaching object became less than or equal to the predetermined value.

Moreover, as a modified example of the above-described embodiment, a structure can be employed in which, in a case in which the distance between the own vehicle and the approaching object is less than or equal to the predetermined value, the correcting section (143) enlarges the range of the light adjustment area only toward the lower side in the vertical direction, based on at least one of the distance between the own vehicle and the approaching object or the relative speed of the own vehicle and the approaching object.

The vehicle front lamp system 10, which includes the light illumination control device 14 relating to the above-described embodiment, can be applied also to vehicles at which autonomous driving is possible.

Any of various types of processors other than a CPU may execute the respective processing that are executed due to the CPU 14A, which is illustrated in FIG. 2, reading-in software (a program) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processing such as ASICs (Application Specific Integrated Circuits) and the like, and the like. Further, the respective processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the program described in the above embodiment may be provided in a form of being recorded on a recording medium such as a CD-ROM (Compact Disk Read Only Memory), a DVD-ROM (Digital Versatile Disk Read Only Memory), a USB (Universal Serial Bus) memory or the like. Further, the program may be in a form of being downloaded from an external device via a network.

Note that the above-described embodiment and above-described, plural modified examples can be implemented by being combined appropriately.

Although examples of the present disclosure have been described above, the present disclosure is not limited to the above, and, of course, can be implemented by being modified in various ways other than the above within a scope that does not depart from the gist thereof

What is claimed is:

1. A light illumination control device that acquires results of sensing of an object present at a front side of an own vehicle, and that, based on the results of sensing, controls light emission of front lamps that illuminate light toward the front side of the own vehicle, the light illumination control device comprising:

a memory; and a processor coupled to the memory, wherein:

in a case in which the object is an object that is a target of light adjustment, the processor computes a light adjustment area that is an area including the object that is a target of light adjustment and in which an amount of light that is illuminated is made to be different than that of illuminated regions other than the light adjustment area, and in a case in which the object that is a target of light adjustment is an approaching object that advances in a direction of approaching the own vehicle, and a distance between the own vehicle and the approaching object is less than or equal to a predetermined value, the processor enlarges a range of the computed light adjustment area, and wherein the processor controls the front lamps so as to make an amount of light illuminated toward the light adjustment area less than an amount of light illuminated toward regions other than the light adjustment area, the amount of light illumination amount of light illuminated toward the light adjustment area being greater than zero.

2. The light illumination control device of claim 1, wherein, in a case in which the distance between the own vehicle and the approaching object is less than or equal to the predetermined value, the processor enlarges the range of the light adjustment area in a left-right direction and toward a lower side in a vertical direction, based on at least one of the distance between the own vehicle and the approaching object or a relative speed of the own vehicle and the approaching object.

3. A light illumination control method that controls light emission of front lamps, which illuminate light toward a front side of an own vehicle, based on results of sensing an object present at the front side of the own vehicle, and in which a computer executes processing comprising:

in a case in which the object is an object that is a target of light adjustment, computing a light adjustment area that is an area including the object that is a target of light adjustment and in which an amount of light that is illuminated is made to be different than that of illuminated regions other than the light adjustment area; and in a case in which the object that is a target of light adjustment is an approaching object that advances in a direction of approaching the own vehicle, and a distance between the own vehicle and the approaching object is less than or equal to a predetermined value, enlarging a range of the computed light adjustment area, and wherein the processor controls the front lamps so as to make an amount of light illuminated toward the light adjustment area less than an amount of light illuminated toward regions other than the light adjustment area, the amount of light illumination amount of light illuminated toward the light adjustment area being greater than zero.

4. A non-transitory recording medium on which is recorded a program that controls light emission of front lamps, which illuminate light toward a front side of an own vehicle, based on results of sensing an object present at the front side of the own vehicle, and that is executable by a computer to perform processing comprising:

in a case in which the object is an object that is a target of light adjustment, computing a light adjustment area that is an area including the object that is a target of light adjustment and in which an amount of light that is illuminated is made to be different than that of illuminated regions other than the light adjustment area; and in a case in which the object that is a target of light adjustment is an approaching object that advances in a direction of approaching the own vehicle, and a distance between the own vehicle and the approaching object is less than or equal to a predetermined value, enlarging a range of the computed light adjustment area, and wherein the processor controls the front lamps so as to make an amount of light illuminated toward the light adjustment area less than an amount of light illuminated toward regions other than the light adjustment area, the amount of light illumination amount of light illuminated toward the light adjustment area being greater than zero.

* * * * *